(12) United States Patent
Davidson et al.

(10) Patent No.: US 6,437,872 B1
(45) Date of Patent: Aug. 20, 2002

(54) MULTIBIT SCREENING OF PRINT DOCUMENTS IN A PDL ENVIRONMENT

(75) Inventors: Michael L. Davidson, deceased, late of Rochester, by Dona Davidson, executrix; Francis K. Tse, Rochester; Harry L. Parker, Rochester; Ramesh Nagarajan, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/158,155

(22) Filed: Sep. 22, 1998

(51) Int. Cl.[7] ............................. G06F 13/00; G06F 3/12; G06K 15/02
(52) U.S. Cl. ...................... 358/1.15; 358/1.9; 358/2.1; 358/3.01; 358/3.07
(58) Field of Search ................................. 358/1.15, 1.9, 358/2.1, 3.01, 3.07

(56) References Cited

U.S. PATENT DOCUMENTS

| | | |
|---|---|---|
| 4,124,870 A | 11/1978 | Schatz et al. |
| 5,258,854 A | 11/1993 | Eschbach |
| 5,274,472 A | 12/1993 | Williams |
| 5,465,173 A | 11/1995 | Ishikawa et al. |
| 5,659,634 A | 8/1997 | Yeh et al. |
| 5,666,470 A | 9/1997 | Parker |
| 5,687,297 A | 11/1997 | Coonan et al. |
| 5,748,860 A | * 5/1998 | Shively .................. 395/114 |
| 5,905,820 A | * 5/1999 | Cushman et al. ........... 382/299 |
| 6,021,217 A | * 2/2000 | Nakahara ................. 382/169 |

\* cited by examiner

Primary Examiner—Joseph Mancuso
Assistant Examiner—Douglas Tran
(74) Attorney, Agent, or Firm—Oliff & Berridge, PLC

(57) ABSTRACT

A high addressable multibit screening device and method for use in a PDL interpreter environment achieve improved printing resolution and quality. A PDL interpreter receives a PDL document from a host source, which identifies one or more objects that can be fully toned (black) or partially toned (line art or images). Each of these objects can be processed differently. Fully toned objects are processed within the interpreter and directly output in a predetermined output. Partially toned objects are sent to a high addressable screening module within the interpreter for processing prior to outputting in a desired output format. The high addressable screening module screens the partially toned objects to obtain multibit screened data for output. This can be achieved by converting an array of single threshold values to an array of three or more sub-threshold values in a way that preserves the pattern specified by the original threshold array (one bit per pixel image), but improves the quality of the rendered image relative to the quality of a one bit per pixel (per colorant) image. The partially toned data is then output with the fully toned objects for subsequent printing. This achieves an increase in available tints and spatial frequency for a given halftone pattern while reducing memory requirements.

8 Claims, 5 Drawing Sheets

| 64 | 192 | 128 | 64 | 192 | 128 | 64 | 192 | 128 |
|---|---|---|---|---|---|---|---|---|
| 64 | 192 | 128 | 64 | 192 | 128 | 64 | 192 | 128 |
| 64 | 192 | 128 | 64 | 192 | 128 | 64 | 192 | 128 |
| 64 | 192 | 128 | 64 | 192 | 128 | 64 | 192 | 128 |

*FIG.6*

| 1800 X 600 X 1 | 600 X 600 X 2 |
|---|---|
| 000 | 00 |
| 001 | 01 |
| 100 | 01 |
| 011 | 10 |
| 110 | 10 |
| 111 | 11 |

*FIG.7*

MULTIBIT SCREENING OF PRINT DOCUMENTS IN A PDL ENVIRONMENT

BACKGROUND OF THE INVENTION

1. Field of Invention

The invention relates to a method and apparatus for improved rendering of PostScript® or other Page Description Language (PDL) documents. More particularly, the invention relates to high addressable multibit screening of partial tone objects in a PDL interpreter environment to achieve better printing resolution and quality.

2. Description of Related Art

Image information, either color or black and white, is commonly derived by scanning in a gray level format containing a large number of levels, e.g., 256 levels for black and white and more than 16 million ($256^3$) levels for color. This multi-level format is usually unprintable by standard printers.

Standard printers print in a limited number of levels, either a spot or no spot in the binary case, or a limited number of levels associated with the spot, for example, four in the quaternary case. Since gray level image data can be represented by very large values, it is necessary to reduce gray level data to a limited number of levels so that it is printable. Besides scanning, processing techniques such as computer generation produce gray level pixel values that require such a conversion.

A common method of converting gray level pixel image data to binary level pixel image data is through the use of screening, dithering or halftoning. In such arrangements, over a given area, each gray level pixel within the area is compared to one of a set of predetermined thresholds. The set of thresholds comprises a matrix of threshold values forming one or more halftone cells.

Graphical objects to be screened have a color attribute typically expressed as a set of integers, one integer for each device colorant. For example, in a one color black and white printer, the color specification uses a single integer. However, in a four color device (typically using the colors cyan, magenta, yellow and black), the device color specification for a graphical object consists of four integers. Screening is performed independently for each device color, possibly in parallel. Each integer represents an encoded value for the fractional tint coverage of ink in the area represented by the graphical object. For example, if the color is represented as an unsigned 8 bit integer, the minimum value may represent no ink coverage and the maximum value 255 may represent 100% ink coverage.

Halftone patterns are typically represented by an array of threshold values, one value for each colorant for each pixel for a normal printer that can print only one bit deep images directly. A PDL document may define the halftone pattern to be used for a given image or line-art object. If it does not, the printing system will use a predefined default pattern.

FIG. 1 illustrates a block diagram of a typical screening circuit. In this screening circuit, an unmodified image or video signal is fed into a modulation circuit 1 with a screen value from a halftone screen matrix to produce a modified signal. The modified signal is then thresholded by a binarization circuit 3 to produce a binary output. The binary output represents either the ON or the OFF characteristic of the processed pixel.

In this process, the sampled image picture elements are compared with a single threshold, and a black/white decision is made. The effect of such an arrangement is that, for a given area where the image is gray, some of the thresholds within the matrix will be exceeded, while others are not. In the binary case, the portions of the matrix, or cell elements, in which the thresholds are exceeded are printed in black, while the remaining elements are allowed to remain white or vise-versa. The effect of the distribution of black and white pixels over the small area is integrated by the human eye as gray.

In a network or single personal computer environment, a user may create a job to be printed comprising one or more pages, each consisting of one or more sections of text, graphics and photos. Alternatively, a job may be scanned in or copied from an existing file. This job is sent to a printer driver for printing and converted into a page description language, such as PostScript®. Typical PDL interpreters, such as the Adobe PostScript Interpreter, process objects defined in the PDL data stream for subsequent printing by the printer. PDL interpreters can exist within the printer, such as a laser printer, or can reside elsewhere in the printing system, such as at an image data source, such as a personal computer or server.

A PDL interpreter receives a PDL document from a host source, such as a personal computer (PC). The interpreter identifies various objects. This includes, but is not limited to, fully toned objects such as black text or lineart, and partially toned objects, such as lineart or images having less than 100% coverage. Such partially toned objects can be grayscale or colored (in a color other than black). The document may also contain halftone pattern definition objects. Each of these objects can be processed differently. Fully toned objects are processed within the interpreter and directly output in a predetermined output format. Partially toned objects are sent to a screening module within the interpreter for processing prior to outputting in a desired output format. The screening module screens the partially toned objects to obtain screened data for output. The halftoned data is output with the fully toned objects for subsequent printing. Halftone pattern objects are used to determine the required halftoning threshold array.

Most PDL interpreters are designed to obtain and render single bit output (ON/OFF states) images for printers with typically several hundred bits per inch in each orthogonal direction. These PDL interpreters are not readily adapted to properly process and obtain multibit deep pixel image data, which is necessary to achieve optimum quality reproduction using a high addressable printer. The standard PostScript® algorithm for 2-bit deep rendered images works well for video monitors or other true continuous tone devices, such as dye sublimation printers. This technique is described in the PostScript Language Reference Manual Second Edition, Addison-Wesley Publishing Co., 1990, the subject matter of which is incorporated herein by reference in its entirety. However, the results for an electrophotographic or lithographic printer, or any other non-continuous printing device, are horrid. These devices cannot reliably reproduce the large areas of partial pixels that the standard screening algorithms produce.

Printing systems have two primary characteristics, optical resolution and addressability. Resolution of a printing system is based on the inking or toning material's resolving power, or ability to maintain separate marks close together. Addressability is the precision of the printing systems ability to assign a digital address to a mark's location on a page. Addressability is a digital design function, while resolution is an analog system characteristic, which is a function of inking and toning materials used, optics, electro-mechanics and system addressability.

In casual conversation, these two characteristics are often confused, and the term "resolution" is often used to mean "addressability." It is not uncommon for systems to have addressability that is significantly higher than actual resolution.

There are many printers capable of 600 dots per inch (dpi) or better resolution. However, so-called high addressable printers (with multibit addressing capabilities) are beginning to emerge. In such high addressable printers, each addressable pixel is capable of representation by more than merely an ON/OFF state. As exemplary high addressable printer is capable of 4 states: ON, OFF, 1/3 ON and 2/3 ON. This exemplary printer has an output pulse width limited to about $1/600^{th}$ of an inch, but positional accuracy can be up to $1/1800^{th}$ of an inch. Such a system has addressability that is several times higher than the system's resolution.

High addressable screening has been achieved in a reprographic environment. For example, see U.S. Pat. No. 5,659,634 to Yeh et al., assigned to the same assignee as this invention and incorporated herein by reference in its entirety. However, in Yeh's system, a scanner renders complete scanned-in images using fixed screening patterns. Such systems cannot obtain and process 2-bit deep composite image data in a PDL interpreter environment.

SUMMARY OF THE INVENTION

The invention provides a method for improved rendering of PDL documents having fully toned and partially toned objects for subsequent printing.

The invention also provides a system that multibit renders and prints page description language documents having partially toned and fully toned objects.

Halftone patterns are represented by an array of threshold values, one value for each colorant for each pixel in a normal one bit deep printer raster image. For 2-bit deep images, three thresholds are used for each pixel: one for the 1/3 on value threshold; a second for the 2/3 on value threshold; and a third for the full on value threshold.

The invention converts an array of single threshold values to an array of three (3) sub-threshold values in a way that preserves the pattern specified by the original threshold array (one bit per pixel image), but improves the quality of the rendered image relative to the quality of a one bit per pixel (per colorant) image. The 3 threshold array is used for multibit halftoning.

The interpreter may reside in a general purpose computer or within a printer.

The screening module may screen at a high scanning resolution and encode to a lower resolution or may screen and encode to a same resolution.

The invention provides an improved process for decomposing and rendering a composite PostScript® or other PDL document for printing on a high addressable multibit printer. A preferred printer according to the invention has an output pulse width limited to $1/600^{th}$ of an inch or wider and positional accuracy of up to $1/1800^{th}$ of an inch, thus providing addressability of 1800 dpi in the light beam scanning direction, although the invention can be practiced with any suitable addressability or resolution.

The invention attains up to three times the number of tints that are reproducible at the given halftone pattern and spatial frequency, which reduces posterization defects.

The invention also has advantages over doubling or tripling the addressability in one direction.

An image representation, in a PDL format, is received by a PDL interpreter, which can reside either in the printer, or in a general purpose computer such as a PC or a server. Objects that are fully toned, such as black text, are distinguished and formatted for single bit output (ON/OFF) within the PDL interpreter, without the need for screening or halftoning. Objects that need to be halftoned (i.e., partially toned regions such as gray areas or color areas generally) are typically in a multibit format, such as 8 bits per pixel (256 levels). These selected partially toned objects are screened to the printer resolution. This screening, preferably achieved within a screening module within the PDL interpreter, screens the selected regions at a resolution such as 600 dpi if the printer's resolution is 600 dpi, although any suitable screening rate can be selected. However, the screening can take place at a resolution higher than the printer's resolution, such as 1800 dpi, and subsequently converted to a 600 dpi. Once screened, the data representing the partially toned object should be in or convertible to a multibit format for subsequent output by the PDL interpreter and printing by a high addressable printer. The actual screening resolution used would depend on the particular capabilities of a desired output printer.

In a conventional screening process, a particular value from a spatially periodic halftone cell threshold array is compared to each pixel at a given resolution, such as 600 dpi. On the other hand, for high addressable screening it is desirable to obtain three (or more) high addressable bits. This is preferably achieved by running calculations at the regular resolution (such as 600 dpi) and computing the high addressable bits using a specific formula. The three high addressable bits store the input image information in a multibit form, rather than pure binary (0 or 1). Possible bit patterns for each pixel are: 000, 001, 100, 011, 110, and 111. This can also be achieved by having three threshold values for each pixel, which increases the size of the threshold array by a factor of three and also the spatial frequency in one direction.

Once screened to a desired halftoned multibit resolution, such as a high addressable multibit 600 dpi output, the screened data is output along with the fully toned objects.

BRIEF DESCRIPTION OF THE DRAWINGS

Reference with be made to the following drawings wherein like numerals refer to like elements and in which:

FIG. 6 is an exemplary single bit original screening threshold array; and

FIG. 7 is a table for converting a high-addressable 3-bit pixel value to a 2-bit gray value.

DETAILED DESCRIPTION OF PREFERRED EMBODIMENTS

Figure 2:
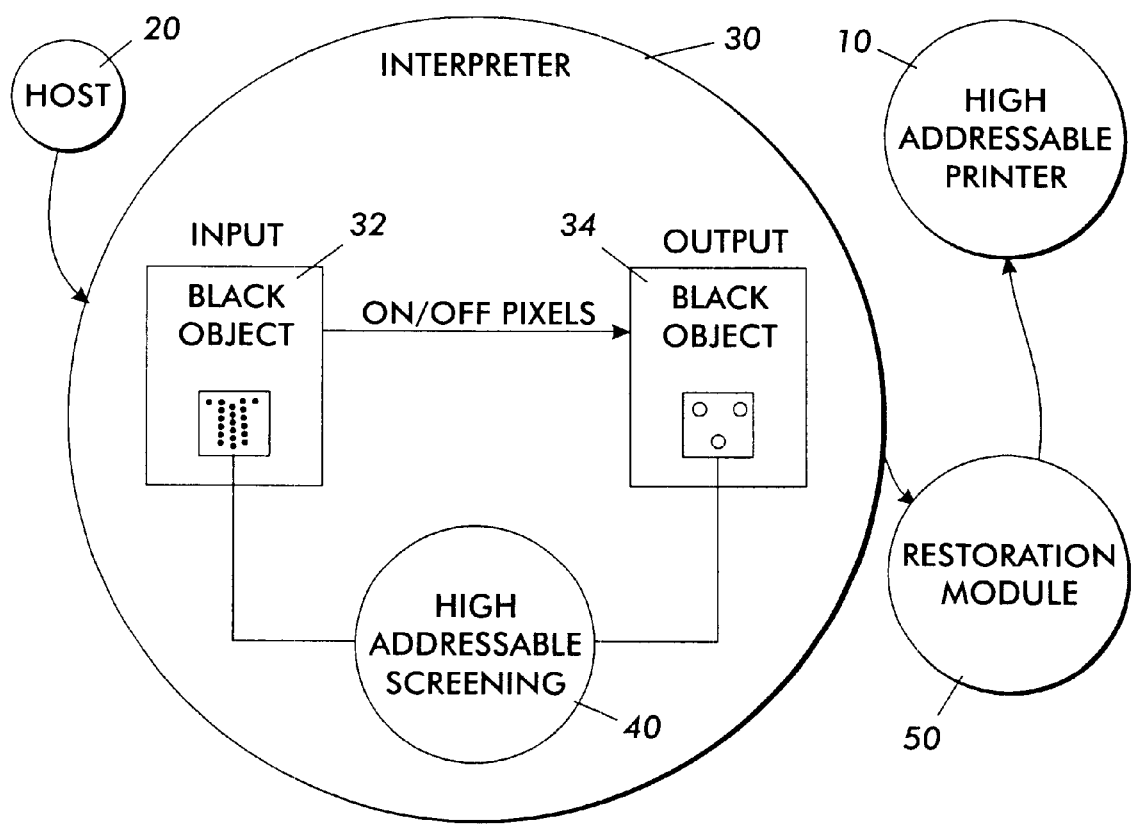
FIG. 2 is a data flow diagram outlining one preferred embodiment of a process for multi-bit screening of a halftone image according to the invention.

FIG. 2 shows a data flow diagram of a PDL document decomposing and rendering process according to this invention. As shown in FIG. 2, a PostScript® document is rendered for reproduction on a high addressable print engine 10. A composite document is provided from a source host 20, such as a general purpose computer, to an input section 32 of a PDL interpreter 30, such as a PostScript® interpreter. The inputted document may include both fully toned graphical objects (such as solid color or black text) and partially toned objects (such as textual line art or images having less than 100% coverage). These documents can be created by the source host 20, or scanned in by a scanner and stored within the host 20.

The fully toned objects of the inputted document are rendered within the PDL interpreter 30 and output directly from the PDL interpreter as 2 bit pixel data at an output section 34. The partially toned (halftone) objects are sent to a high addressable screening module within PDL interpreter 30 in a 8-bit per colorant format. The high addressable screening module performs high addressable screening on the partially toned graphical objects to obtain pixel image values at a desired multi-bit addressability, such as a 2 bit 600 dpi pixel output format. This improves the quality of the rendered image relative to the quality of a one bit per pixel image, while preserving the pattern specified by an original one-bit threshold array. Any suitable multi-bit output may be used, depending on the addressability and resolution of the high addressable printer being used. While a preferred embodiment uses three sub-thresholds, this number is merely illustrative and not intended to be limiting.

After rendering and screening, the partially toned objects are in a multi-bit deep pixel data output format at the device resolution. The output from output section 34 of the PDL interpreter 30, which includes both the fully toned and partially toned objects, is then sent to a restoration circuit 50 that restores data to a format useable by the high addressable printer 10, such as 1800 dpi in the light beam scanning direction. In a preferred embodiment, the multi-bit deep pixel data is directly determined. Alternatively, screening can take place at a different screening addressability, such as 1800 dpi in the light beam scanning direction, and the data can be encoded to a special multi-bit output format, such as a multibit (2) 600 dpi format. The output from the interpreter is again sent to high addressable restoration circuit 50, which decodes the multibit format pixel image values into a high resolution printable 1800 dpi in the light beam scanning direction format. This printable image pixel data is then sent to the high addressable printer 10.

Figure 3A:
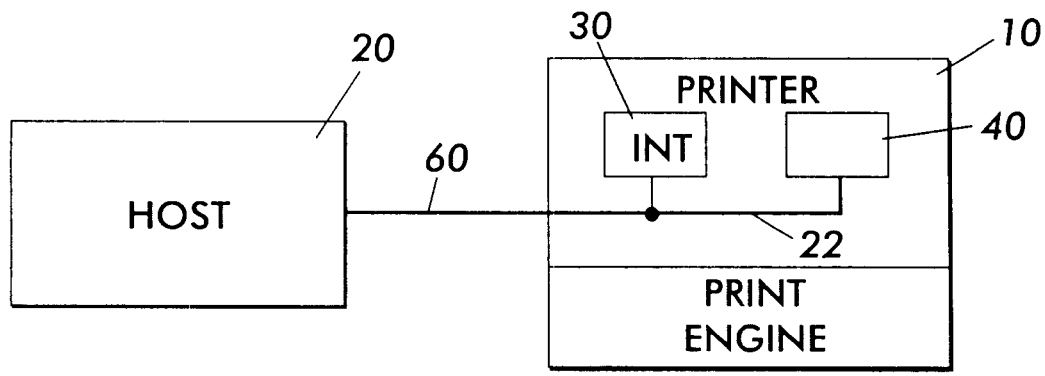
FIGS. 3A–3B are exemplary configurations of an interpreter and screening module according to the invention.
Figure 3B:
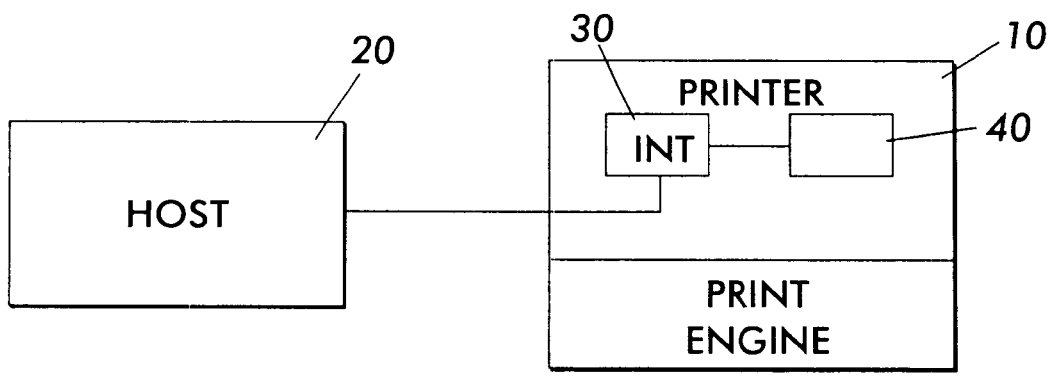

The PDL interpreter 30 and screening module 40 can take several forms. In FIG. 3B, the preferred form of the PDL interpreter 30 is located in software within printer 10. The screening module 40 may also be located in software within printer 10. Alternatively, the screening mode could be implemented in hardware as in FIG. 3A. In such a configuration, PDL interpreter 30 and screening module 40 are connected to a bus 22, which is connected to host 20 through any suitable connection, such as a conventional serial or parallel printer cable or network connection 60. Alternatively, PDL interpreter 30 and screening module 40 could be located in software within host 20, which can be a general purpose computer or in a separate computer.

Interpreters work in several main steps. The front end of the interpreter parses the PDL data into operands and their arguments as the data stream is received. Once a complete command is parsed, these operations are performed to create graphical and other kinds of objects, such as halftone specifications and end-of-page and end-of-job markers. The graphical objects are then rendered onto the output page memory.

Figure 4:
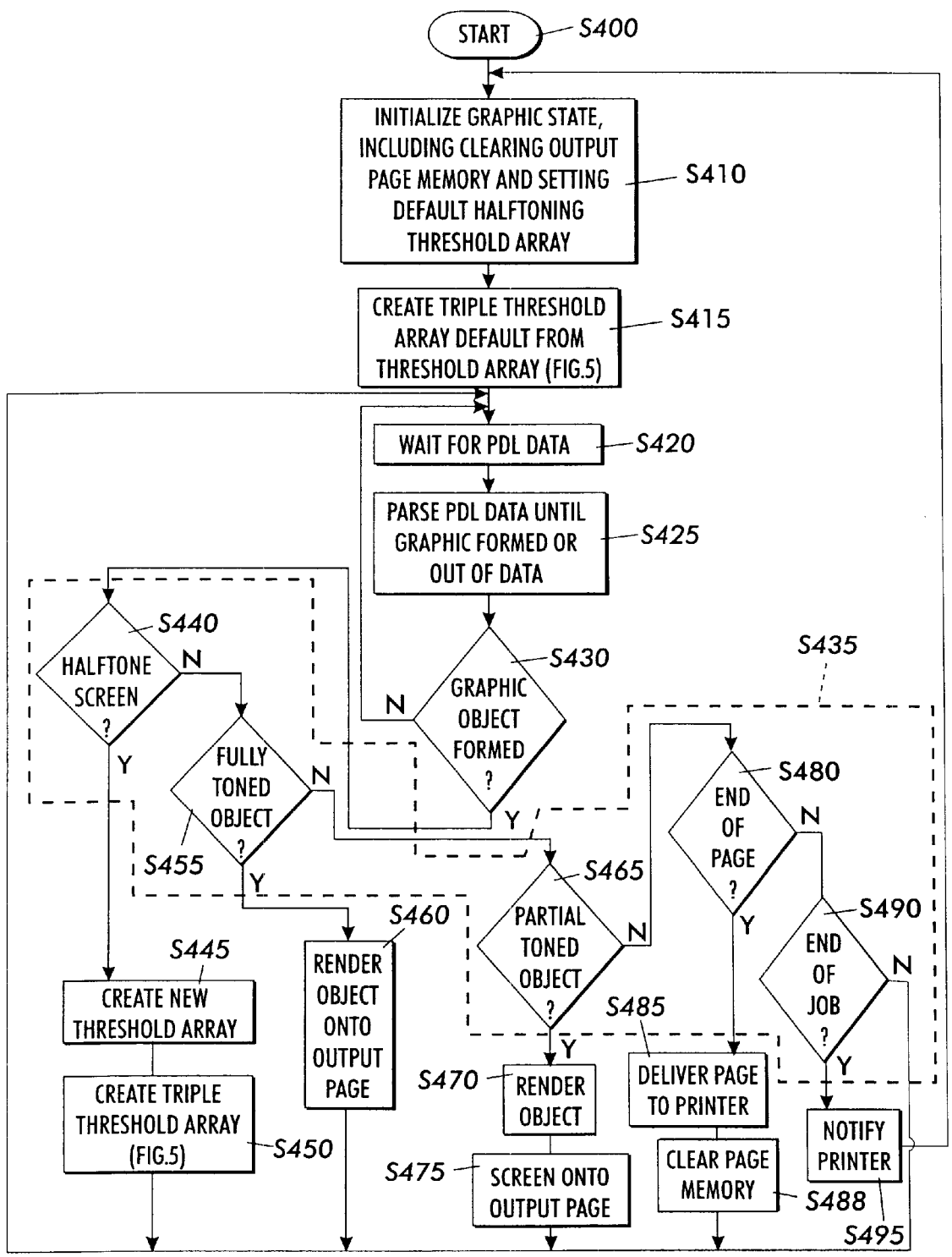
FIG. 4 is a flowchart outlining a process for obtaining a multi-bit deep screening of PDL documents according to the invention.

A preferred process of halftone rendering according to the invention will be described with reference to FIG. 4. At step S400, the process starts and proceeds to step S410 where a graphic state is initilized, an output page memory is cleared and a default halftoning threshold array is set. The process then proceeds to step S415 where a triple threshold array default is created. This is shown in more detail with reference to FIG. 5. While three (3) sub-pixel thresholds are chosen in a preferred embodiment, this number is not meant to be limiting. It can be any suitable number of sub-pixels. After step S415, the process waits at step S420 for incoming PDL data. At step S425, the PDL data is parsed. At step S430, the process checks for formation of a graphic object. If one is formed, the process proceeds to step S435. If not, the process returns to step S420.

At step S435, the graphic object type is determined. Based on this determination, various routines are performed. In particular, this determination step can comprise a plurality of decision blocks S440, S455, S465, S480 and S490 as shown. Based on these decision blocks, the process can proceed to steps S445, S460, S470, S485, S495 or S420.

If a halftone screen object is determined by step S440, the process proceeds to step S445 and a new threshold away is created. Then, at step S450, a new triple threshold array is created, using the process described in FIG. 5.

The process then returns to step S420. If a fully toned object is determined at step S455, the process proceeds to step S460 where the object is rendered onto an output page. The process then returns to step S420.

If a partial toned object is determined at step S465, the process proceeds to step S470 where the object is rendered. Then, the process proceeds to step S475 and the object is screened onto the output page using the triple threshold array created in one of steps S415 or S450. After step S475, the process returns to step S420.

If an end-of-page object is determined at step S480, the process proceeds to step S485, where the output page is delivered to an output printer. Then, the process proceeds to step S488 where the page memory is cleared. After step S488, the process returns to step S420.

If an end-of-job object is determined at step S490, the process proceeds to step S495 to notify the printer of such. Otherwise, the process proceeds to S420.

In the process described above, steps S415, S450 and S475 (which is affected by steps S415 and S450) are important steps of the process that achieve high addressable screening that is not achieved by standard PDL interpreters.

Halftoning is preferably performed in the PDL interpreter 30 environment via function calls in the local process context (address space), which call the screening module 40. Besides residing in software, PDL interpreter 30 and/or screening module 40 could incorporate hardware circuits, which could increase the speed of halftone calculations.

Figure 1:
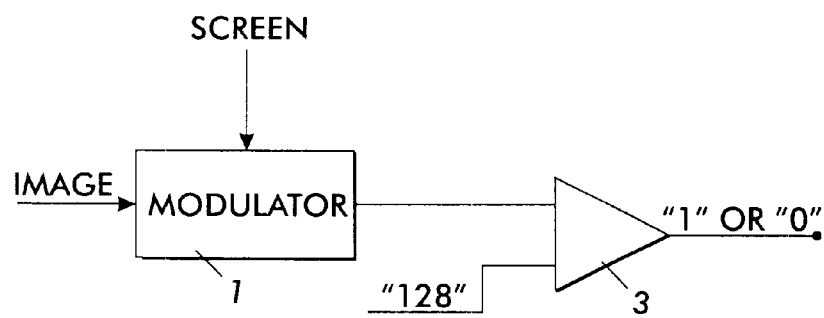
FIG. 1 illustrates a conventional screening circuit.

In a conventional screening process, as shown in FIG. 1, a particular value from a spatially periodic halftone cell threshold array is compared to each pixel at, for example, 600 dpi. On the other hand, for high addressable screening, it is desirable to obtain three (3) high addressable bits. The three high addressable bits store the input image information in a multibit form, rather than pure binary (0 or 1).

High addressability can be achieved by running 600 dpi calculations and computing the high addressable bits using a specific formula. An example of a solution to computing three threshold values can be found by:

$$N - k * graydelta,$$

where:

N is the particular array value;

k=0 to 2; and graydelta is the difference between two consecutive threshold values.

The possible bit patterns for each pixel are: 000, 001, 100, 011, 110, and 111.

Figure 5:
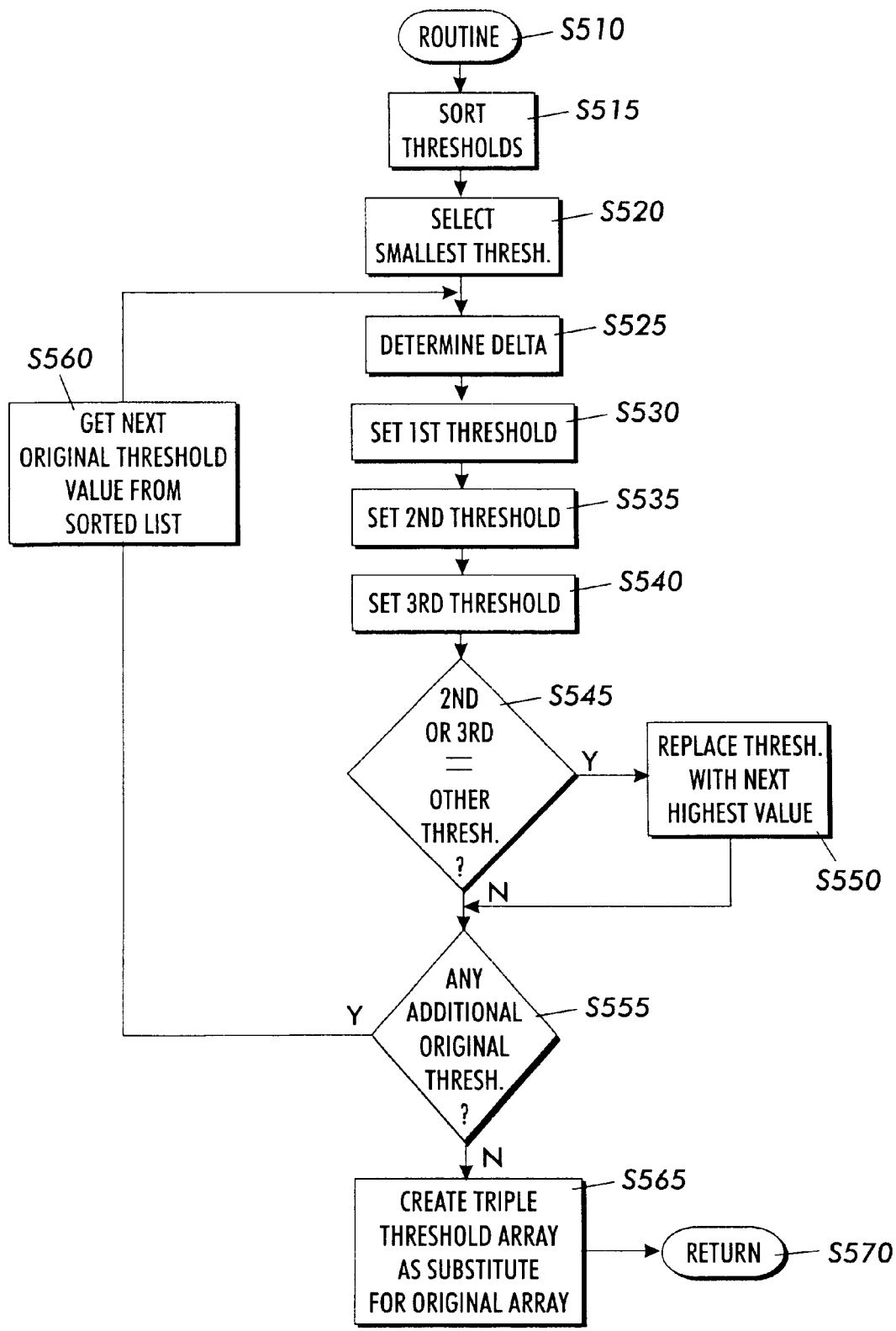
FIG. 5 is a flowchart outlining a preferred multi-bit threshold array creation routine according to the invention.

The preferred three (3) threshold array creation can be achieved by the following process described with reference to FIGS. 5 and 6. In step S510, the process starts with the 2-bit threshold creation routine. Flow then proceeds to step S515 where thresholds of the original halftone cell array specified by the halftone objects are sorted in ascending order. At step S520, the process selects the smallest original threshold array value. At step S525, the process determines a difference (Delta) between the value and a next lower array value, if one exists. In the case of the first value, it does not. At step S530, a $1^{st}$ threshold is set corresponding to the input threshold value. As step S535, a $2^{nd}$ threshold is set as the $1^{st}$ threshold minus Delta×⅓, rounded to the nearest integer. At step S540, the process sets a $3^{rd}$ threshold as the $1^{st}$ threshold minus Delta×⅔, rounded to the nearest integer. At step S545, the process checks to see if either the $2^{nd}$ or $3^{rd}$ threshold equals other original array values. If no, the process proceeds to step S555. If yes, flow proceeds to step S550 and the $2^{nd}$ or $3^{rd}$ threshold is set to a next highest representable value so that a generated halftone is not distorted from the original. At step S555, it is determined if additional original array values exist. If so, the process proceeds to step S560. If not, the process proceeds to step S570 and returns to the main program. At step S560, the routine gets the next original threshold value from the sorted array. After all the threshold values are processed, the routine proceeds to step S565, where the new triple threshold array values are written into their proper locations indicated by the locations of the original threshold array values in their matrix. From step S560, the process returns to step S525.

An exemplary threshold array is shown in FIG. 6. For a particular threshold value 128, Delta would be 64/3=21 (64 is the difference between threshold value 128 and the next lowest threshold value of 64). For this particular threshold value of 128, the three sub-threshold values would be:

$T_1=128-0*21=128$ $T_2=128-1*21=107$ $T_2=128-2*21=86$

Therefore, for an exemplary incoming video graylevel value of 100, the output 3-bit pattern is computed by comparing against each of the three sub-thresholds, resulting in an output of 110.

With the inventive multibit screening, up to three times the number of tints are reproducible at a given halftone pattern and spatial frequency. This reduces printing posterization defects. This embodiment has advantages over doubling the addressability in one direction. Doubling the addressability in one direction would require the same number of bits per square inch to represent a rendered image at n by m by 2. However, this technique would only allow two times the number of reproducible tints of a given halftone pattern, compared with 3 times the number achieved by the inventive high addressable screening technique. Moreover, if the addressability is raised beyond the devices true optical resolution, a line dropout image defect can occur. Such a defect can occur when the PDL interpreter tries to render any single pixel line width in a direction when the marking engine cannot mark such a thin line. This does not occur with the inventive high addressable screening.

Rather than computing the three sub-threshold values, the same number of tints can be produced by screening the partially toned objects at three times the addressability in one direction, such as 1800 dpi in the light beam scanning direction for a 600 dpi. In this embodiment, once the image has been screened to obtain the high addressable bits, the screened image may be encoded to a format that saves on storage requirements. The 3 binary values are preferably encoded at a printer resolution to a 2-bit gray value at source resolution, such as a 2-bit 600 dpi. Thus, a 2-bit gray pixel value is used as the format between decomposition and printing. The encoding can be achieved using the scheme described with reference to FIG. 7.

As shown in FIG. 7, the 3-bit pattern 000 is encoded as a 2-bit pattern 00. Both of the 3-bit patterns 001 and 100 are encoded as a 2-bit pattern 01. Both of the 3-bit patterns 011 and 110 are encoded as a 2-bit pattern 10. The 3-bit pattern 111 is encoded as a 2-bit pattern 11. The 2-bit patterns can be stored more readily as one less bit is present, although the modified encoded 2-bit format no longer includes bit position information.

The specially formatted output (2 bit 600 dpi) from the PDL interpreter 30 can be decoded by restoration module 50, which can be compact dot growth circuitry to generate the final high addressable bits (3 bits) used for printing by the printer 10. The decoding restores the pixel image to full resolution, including restoration of bit position information. U.S. Pat. No. 5,659,634 to Yeh, incorporated herein in its entirety, provides an example of decoding the two-bit data to obtain positional information. Additionally, high addressability restoration can use appearance tuning to lighten or darken the pixels as described in U.S. Pat. No. 5,666,470 to Parker and U.S. Pat. No. 5,687,297 to Coonan et al., each incorporated herein in its entirety.

In an exemplary printer, print states of ON, OFF, ⅓ ON and ⅔ ON are capable. By detecting an edge or a transition in brightness between a center pixel of a matrix and its surrounding neighbors, the center pixel can be electrically manipulated to a 2-bit value print state value of ON, OFF, ⅓ ON and ⅔ ON. The pixel matrix is preferably compared to a predefined set of templates and when a match is made, image processing occurs. A suitable matrix of the incoming encoded halftone region screened pixel data can be a 3×3 matrix.

The first embodiment has advantages over tripling the addressability in one direction, as done in the second embodiment. While a same number of tints can be reproduced, tripling the addressability in one direction involves 50% more image memory. Moreover, tripling of the addressability can result in even further line dropout problems.

Another alternative high addressable screening approach is described in U.S. patent application Ser. No. 08/285,328 to Williams et al., entitled "A Method and System for Processing Image Information Using Screening and Error Diffusion", which is incorporated herein in its entirety.

A further process for obtaining high addressable screening can be found in U.S. Pat. No. 5,274,472 to Williams et al., which is incorporated herein in its entirety.

PDL interpreter 30 and/or the screening module 40 are each preferably implemented on a programmed general purpose computer. However, the PDL interpreter 30 and/or the screening module 40 can each also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PDL, PLA, FPGA or PAL, or the like. In general, any device, capable of implementing a finite state machine that is in turn capable of implementing the flowcharts shown in FIG. 5, can be used to implement either the PDL interpreter 30 and/or the screening circuit 40.

Although this invention has been described in detail above with reference to preferred embodiments, various modifications can be implemented without departing from the spirit and scope of the invention. For example, while described with respect to a printing system, the processes are readily implemented in a display system. While a range of 0 to 255 for the image density values has been described, other ranges can be used. Moreover, while described with respect to a monochrome environment, the concepts of the invention are readily applicable to a color environment. Additionally, the invention can be practiced without encoding of the halftone regions to a lower resolution. In such an embodiment, the restoration circuit is also not necessary. Accordingly, output from the interpreter would go directly to the printer.

What is claimed is:

1. A rendering apparatus that renders page description language documents for printing by a high addressable printer, the documents having at least one of a fully toned object and a partially toned object, the apparatus comprising:
    a page description language interpreter having an input section and an output section, the input section receiving a document representing a page to be printed, the document being formatted in a page description language;
    means within the interpreter for distinguishing a partially toned object and a fully toned object;
    means for processing a fully toned object and outputting the fully toned object as fully toned object data in a predetermined output format;
    means for screening the partially toned objects to obtain multibit deep partially toned data in a predetermined format, which includes
    means for determining a threshold pattern array at a given addressability;
    means for calculating sub-pixel thresholds from the threshold pattern array;
    means for screening by comparing an input signal against the sub-pixels to achieve multibit deep screening; and
    means for sending the fully toned object data and the halftone data to a printer for subsequent printing by a high addressable printer.

2. The apparatus of claim 1, wherein the means for calculating calculates three sub-pixel thresholds.

3. A method for rendering page description language document having at least one of a fully toned object and a partially toned objects for subsequent printing by a high addressable printer, comprising:
    receiving a page description language document having one or more objects in a page description language interpreter;
    identifying fully toned and partially toned objects within the document;
    processing the fully toned output within the interpreter to achieve fully toned output data in a first format;
    screening the partially toned objects to obtain multibit deep partially toned data in a predetermined format, which includes
    determining a threshold pattern array at a given addressability;
    calculating sub-pixel thresholds from the threshold pattern array; and
    screening by comparing an input signal against the sub-pixels to achieve multibit deep screening; and
    outputting the fully toned data and the partially toned data from the page description language interpreter; and
    printing a representation of the document on a high addressable printer using the fully toned data and partially toned data.

4. The method of claim 3, wherein the step of calculating calculates three sub-pixel thresholds.

5. The method of claim 3, wherein the step of calculating sub-pixels is performed by use of the formula:

$$N-k*\text{graydelta},$$

where:
    N is a particular array value;
    K=0 to 2; and
    graydelta is the difference between two consecutive threshold values.

6. The method of claim 5, further comprising a step of creating a default multiple sub-pixel threshold array based on a default halftoning threshold array.

7. The method of claim 6, further comprising the steps of:
    determining a halftone screen object;
    creating a new threshold array based on the halftone screen object; and
    creating a new multiple sub-pixel threshold array based on the new threshold array,
    wherein the step of screening uses the new multiple sub-pixel threshold array.

8. The method of claim 7, wherein the new multiple sub-pixel threshold array includes three sub-pixels.

* * * * *